US009682649B2

(12) United States Patent
Salter et al.

(10) Patent No.: US 9,682,649 B2
(45) Date of Patent: Jun. 20, 2017

(54) PHOTOLUMINESCENT WINCH APPARATUS (71) Applicant: Ford Global Technologies, LLC, Dearborn, MI (US)

(72) Inventors: Stuart C. Salter, White Lake, MI (US); James J. Surman, Clinton Township, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 14/753,542

(22) Filed: Jun. 29, 2015

(65) Prior Publication Data

US 2015/0298597 A1    Oct. 22, 2015

Related U.S. Application Data (63) Continuation-in-part of application No. 14/603,681, filed on Jan. 23, 2015, now Pat. No. 9,315,145, which
(Continued)

(51) Int. Cl.
| B60Q 1/26 | (2006.01) |
| B66D 1/28 | (2006.01) |
| B60Q 1/50 | (2006.01) |
| F21S 8/10 | (2006.01) |
| D07B 1/14 | (2006.01) |
| F21V 8/00 | (2006.01) |

(52) U.S. Cl.
CPC .............. *B60Q 1/2661* (2013.01); *B60Q 1/50* (2013.01); *B66D 1/28* (2013.01); *D07B 1/148* (2013.01); *F21S 48/214* (2013.01); *G02B 6/0031* (2013.01); *G02B 6/0068* (2013.01)

(58) Field of Classification Search
CPC ........... H01L 2224/48247; H01L 33/62; H01L 2224/73265; H01L 2224/48257; H01L 2933/0041; H01L 33/08; H01L 33/502; H01L 33/504
USPC ... 362/600, 601, 551, 564, 582, 51–57, 485, 362/487, 509, 510, 512, 648, 230, 231, 362/803
See application file for complete search history.

(56) References Cited

U.S. PATENT DOCUMENTS 2,382,355 A    8/1945 Warren, Jr.
2,939,271 A    6/1960 Nadel
(Continued)

FOREIGN PATENT DOCUMENTS

CN    101337492 A    1/2009
CN    201169230 Y    2/2009
(Continued)

*Primary Examiner* — Tuyet Vo
(74) *Attorney, Agent, or Firm* — Jason Rogers; Price Heneveld, LLP (57) ABSTRACT An illumination apparatus for a winch configured to engage a retractable cord is disclosed. The illumination apparatus comprises a light source configured to emit an excitation emission at a first wavelength. The excitation emission is configured to activate an illumination of at least a portion of the retractable cord. A first photoluminescent portion is disposed on the retractable cord and configured to emit a first output emission having a second wavelength different from the first wavelength in response to receiving the excitation emission. The first photoluminescent portion may serve as a marker or visible notification of a position or portion of the retractable cord.

20 Claims, 6 Drawing Sheets

Related U.S. Application Data is a continuation-in-part of application No. 14/086,442, filed on Nov. 21, 2013.

(56) References Cited

U.S. PATENT DOCUMENTS

| | | |
|---|---|---|
| 5,709,453 A | 1/1998 | Krent et al. |
| 6,031,511 A | 2/2000 | DeLuca et al. |
| 6,117,362 A | 9/2000 | Yen et al. |
| 6,494,490 B1 | 12/2002 | Trantoul |
| 6,577,073 B2 | 6/2003 | Shimizu et al. |
| 6,729,738 B2 | 5/2004 | Thompson et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,401,961 B2 | 7/2008 | Longatti et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2006/0087826 A1 | 4/2006 | Anderson |
| 2006/0097121 A1 | 5/2006 | Fugate |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0239165 A1 | 8/2014 | Rolland |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1331198 A1 | 7/2003 |
| EP | 1793261 A1 | 6/2007 |
| EP | 2778209 A1 | 9/2014 |
| JP | H01200388 A | 8/1989 |
| JP | 2000159011 A | 6/2000 |
| JP | 2007238063 A | 9/2007 |
| WO | 2006047306 A1 | 5/2006 |
| WO | 2014068440 A1 | 5/2014 |

PHOTOLUMINESCENT WINCH APPARATUS

CROSS-REFERENCE TO RELATED APPLICATIONS

This application is a continuation-in-part of U.S. Pat. No. 9,315,145, filed Jan. 23, 2015, and entitled "PHOTOLUMINESCENT TAILGATE AND STEP," which is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to a vehicle lighting apparatus, and more particularly, to a vehicle lighting apparatus employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present invention, an illumination apparatus for a winch configured to engage a retractable cord is disclosed. The illumination apparatus comprises a light source configured to emit an excitation emission at a first wavelength. The excitation emission is configured to activate an illumination of at least a portion of the retractable cord. A first photoluminescent portion is disposed on the retractable cord and configured to emit a first output emission having a second wavelength different from the first wavelength in response to receiving the excitation emission. The first photoluminescent portion may serve as a marker or visible notification of a position or portion of the retractable cord.

According to another aspect of the present invention, a winch assembly configured to engage a retractable cord is disclosed. The winch assembly comprises a light source configured to emit an excitation emission at a first wavelength to illuminate at least a portion of the retractable cord. A photoluminescent portion is disposed proximate the light source and configured to convert a first part of the excitation emission to a first output emission. The first output emission comprises at least a second wavelength of light configured to illuminate a region proximate the retractable cord.

According to yet another aspect of the present invention, an illumination apparatus for a winch is disclosed. The illumination apparatus is configured to engage a retractable cord and comprises a light source configured to emit an excitation emission at a first wavelength. The excitation emission is configured to selectively activate an illumination of at least a portion of the retractable cord. A first photoluminescent portion is disposed on the retractable cord and configured to emit a first output emission having a second wavelength different from the first wavelength in response to receiving the excitation emission. A second photoluminescent portion disposed on the retractable cord and configured to emit a second output emission having a third wavelength in response to receiving the excitation emission. The third wavelength is different from the first wavelength and the second wavelength.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting apparatus for a winch. The lighting apparatus is configured to illuminate at least one portion of a cord, line, retractable line/cable, or draw cord of the winch. In some implementations, a light source may be utilized to illuminate the at least one portion of the cord such that the portion is visible in dark ambient conditions to assist with the operation of the winch. The light source may be configured to emit light at a first wavelength or an excitation emission to excite a first photoluminescent portion disposed along the at least one portion of the cord. The first photoluminescent portion may be configured to convert the first wavelength into a second wavelength or a first output emission. The first wavelength may correspond to a first color of light and the second wavelength may correspond to a second color of light, different from the first color. While the various implementations of the lighting apparatus described herein refer to specific structures demonstrated in reference to a winch for use with an automotive vehicle, it will be appreciated that the vehicle lighting apparatus may be utilized in a variety of applications.

Figure 1:
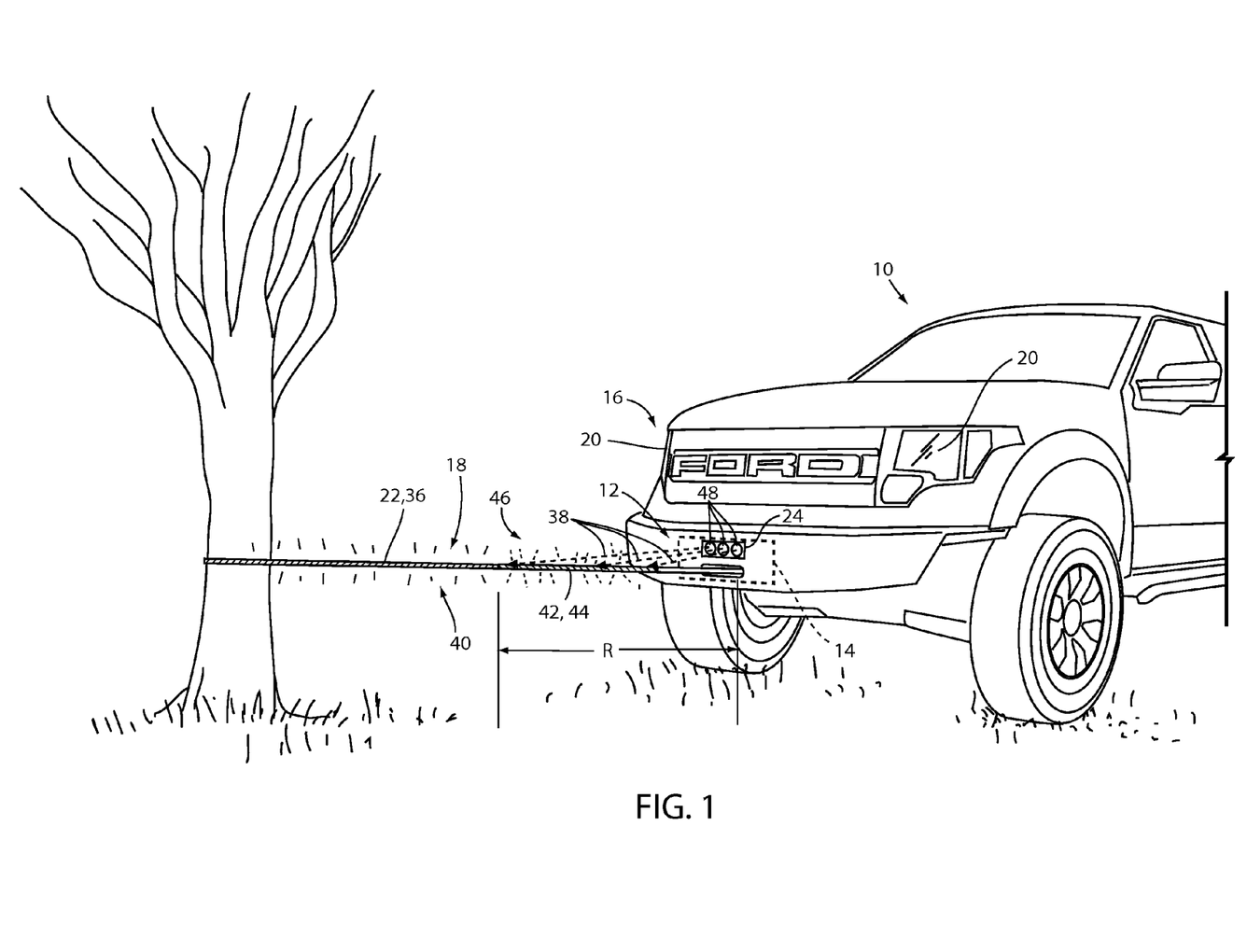
FIG. 1 is a perspective view of an exterior of a vehicle demonstrating a lighting apparatus for a winch.

Referring to FIG. 1, a perspective view of a vehicle 10 is shown demonstrating a lighting apparatus 12 for a winch 14. In an exemplary embodiment, the winch 14 may be connected to a forward portion 16 of the vehicle 10 and configured to engage a cord 18 and retract the cord 18. The winch 14 may further be located centrally between headlights 20 of the vehicle 10. In this configuration, the winch 14 may be located such that light emitted from the headlight 20 does not significantly illuminate at least a first portion 22 of the cord 18 when located proximate the forward portion 16. As discussed herein, the lighting apparatus 12 comprises a light source 24 configured to illuminate at least the first portion 22 of the cord 18 to provide for improved operation, particularly in dark environmental lighting conditions.

Figure 2:
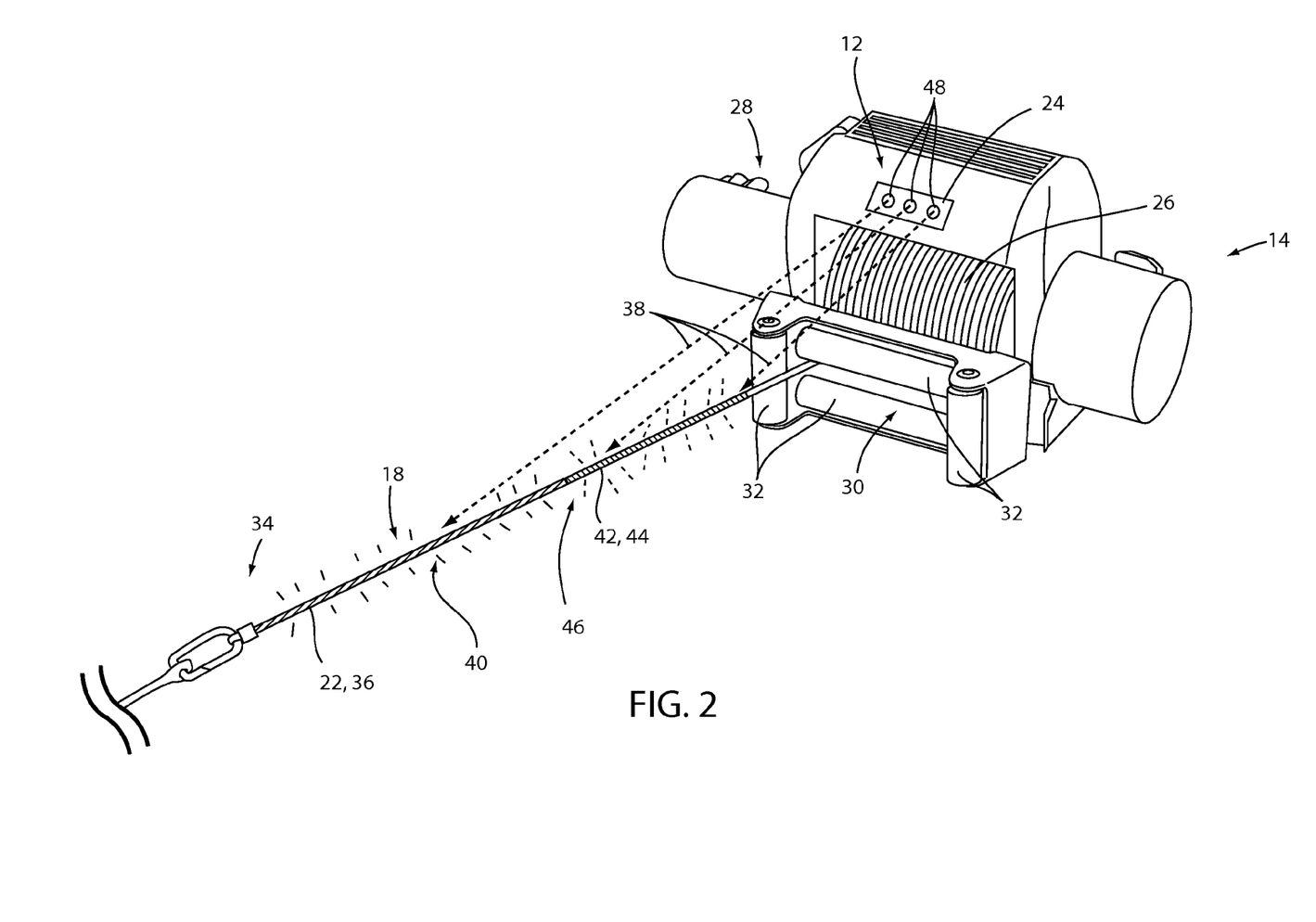
FIG. 2 is a perspective view of a winch comprising a lighting apparatus.

Referring now to FIGS. 1 and 2, the winch 14 comprises a spool 26 in connection with a motor 28 configured to retract the cord 18. The cord 18 is retracted through a guide assembly 30 comprising a plurality of rollers 32 configured to direct the cord 18 to the spool 26. In operation, the cord 18 may be gradually retracted onto the spool 26 such that a distal end portion 34 of the cord 18 approaches the guide assembly 30. To improve operation of the winch 14, the light source 24 of the lighting apparatus 12 may be configured to illuminate the first portion 22 of the cord 18 to ensure that an operator of the winch 14 can identify the first portion 22. In this configuration, the first portion 22 may serve as a notification that the distal end portion 34 is approaching the guide assembly 30.

The first portion 22 of the cord 18 may be coated, painted, infused with or otherwise comprise a first photoluminescent portion 36. The first photoluminescent portion 36 may be configured to illuminate and emit a second wavelength in response to receiving an excitation emission 38 at a first wavelength from the light source 24. The light source 24 may be configured to emit the excitation emission 38 toward the first photoluminescent portion 36 such that the first wavelength of the excitation emission 38 impinges upon the first photoluminescent portion 36. In response to receiving the excitation emission 38, the first photoluminescent portion 36 may become excited and emit a first output emission 40. In this way, the lighting apparatus 12 may selectively illuminate the first portion 22 as a marker or visible notification to improve operation of the winch 14.

In some implementations, a second photoluminescent portion 42 may be disposed on a second portion 44 of the cord 18. The second photoluminescent portion 42 may be configured to illuminate and emit a third wavelength in response to receiving the excitation emission 38. Similar to the first photoluminescent portion 36, the light source 24 may direct the excitation emission 38 toward a region proximate the guide assembly 30 to illuminate the second photoluminescent portion 42 in a second output emission 46 at the third wavelength. The third wavelength may correspond to a different color of light than the second wavelength of the first output emission 40. As described in reference to FIGS. 3, 4, and 5, each of the photoluminescent portions (e.g. photoluminescent portions 36, 42, etc.) discussed herein may emit different colors of light due to specific photoluminescent materials or combinations thereof that are incorporated in the photoluminescent portions. In this way, the lighting apparatus 12 may be configured to illuminate the first portion 22 of the cord 18 in a first color of light and the second portion 44 in a second color of light to improve operation of the winch 14 in dark environmental lighting conditions.

The excitation emission 38 may be configured to impinge upon the cord 18 at a variety of different ranges to suit a desired operation of the winch 14. For example, in some implementations, the excitation emission 38 may be directed to a region R extending approximately 1 m from the forward portion 16 of the vehicle 10. In some implementations, the excitation emission 38 may be configured to be directed to a region extending approximately 1 m from the forward portion 16 of the vehicle 10 to approximately 3 m. The specific distances described herein are examples of potential configurations of the lighting apparatus 12 and should not be considered limiting to the inventive subject matter generally described herein.

The first wavelength of the excitation emission 38 may correspond to a violet or deep blue color of light. The first wavelength may have a peak wavelength of approximately less than 500 nm. The second wavelength, third wavelength, etc. of the one or more output emissions may correspond to one or more wavelengths of light comprising at least one wavelength greater in length than the first wavelength. In some implementations, one or more of the output emissions may correspond to a plurality of wavelengths that may appear as significantly white light. In response to the excitation caused by receiving the light at the first wavelength, the photoluminescent portions (e.g. photoluminescent portions 36, 42, etc.) may be configured to convert the first wavelength to emit output emissions to illuminate at least a portion of the cord 18 and/or a region R extending from the forward portion 16 of the vehicle 10.

The light source 24 may comprise a plurality of emitters 48 in communication with a controller. The controller may be configured to selectively illuminate each of the plurality of emitters 48 in response to one or more winch operation conditions and/or vehicle conditions. For example, the controller may be configured to illuminate the light source 24 in response to a retracting or extending operation of the winch 14. The controller may also be configured to activate the light source 24 in response to a gear selection of a transmission of the vehicle 10, a lighting condition detected by one or more sensors in communication with the controller, an ignition event, an entry of the vehicle 10, a proximity detection of a key fob, and many additional conditions that may be detected and/or identified in signals received by the controller. In this way, the disclosure may provide for systems configured to control the lighting apparatus 12 to provide lighting to improve the operation of the winch 14 and the vehicle 10.

Figure 3A:
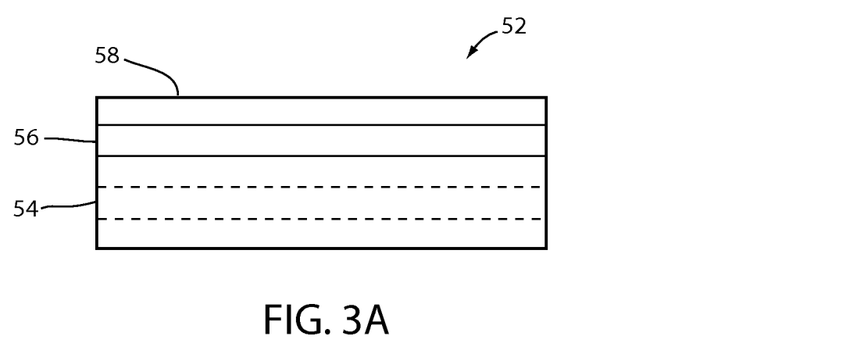
FIG. 3A illustrates a side view of a photoluminescent structure rendered as a coating.
Figure 3B:
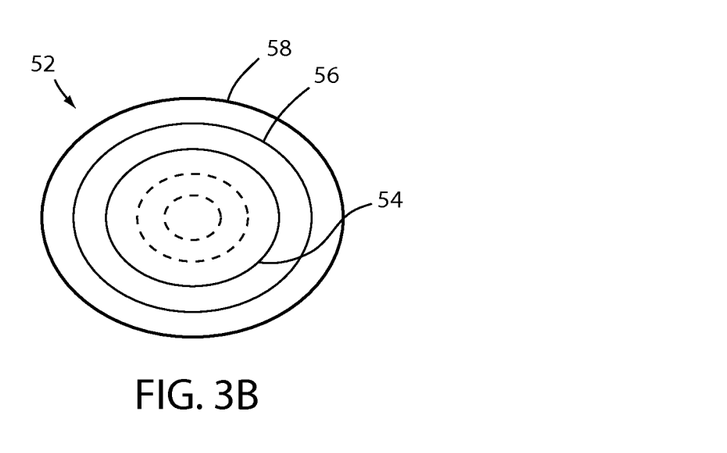
FIG. 3B illustrates a side view of a photoluminescent structure rendered as a discrete particle.
Figure 3C:
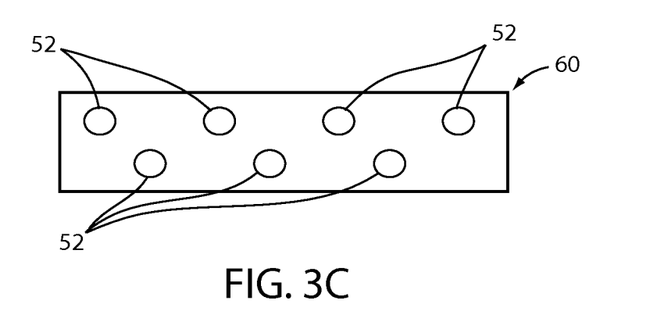
FIG. 3C illustrates a side view of a plurality of photoluminescent structures rendered as discrete particles and incorporated into a separate structure.

Referring to FIGS. 3A-3C, a photoluminescent structure 52 is generally shown rendered as a coating (e.g. a film) capable of being applied to at least a portion of the cord 18, a discrete particle capable of being implanted into the cord 18, and a plurality of discrete particles incorporated into a separate structure capable of being applied to the cord 18, respectively. As described herein, the cord 18 may correspond to any surface or portion of a retractable line and/or connecting feature in connection with the cord 18. The photoluminescent structure 52 may correspond to the photoluminescent portions as discussed herein, for example, the first photoluminescent portion 36, the second photoluminescent portion 42, and the third photoluminescent portion.

In some embodiments, the photoluminescent structure 52 may similarly be incorporated in one of more fixtures of the winch 14. A fixture may correspond to one or more panels, windows, and/or at least partially light transmissive portions of the winch 14 that may be configured to transmit at least a portion of an excitation emission 38 therethrough. The various embodiments of the lighting apparatus 12 may comprise one or more photoluminescent portions to illuminate a portion of the winch 14. At the most basic level, the photoluminescent structure 52 includes an energy conversion layer 54 that may be provided as a single layer or a multilayer structure, as shown through broken lines in FIGS. 3A and 3B.

The energy conversion layer 54 may include one or more photoluminescent materials having energy converting elements selected from a phosphorescent or a fluorescent material. The photoluminescent materials may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as the Stokes shift and serves as the principle driving mechanism for an energy conversion process corresponding to a change in wavelength of light, often referred to as down conversion. In the various implementations discussed herein, each of the wavelengths of light (e.g. the first wavelength, etc.) correspond to electromagnetic radiation utilized in the conversion process.

Each of the photoluminescent portions may comprise at least one photoluminescent structure 52 comprising an energy conversion layer (e.g. conversion layer 54). The energy conversion layer 54 may be prepared by dispersing the photoluminescent material in a polymer matrix 60 to form a homogenous mixture using a variety of methods. Such methods may include preparing the energy conversion layer 54 from a formulation in a liquid carrier medium and coating the energy conversion layer 54 to a desired planar and/or non-planar substrate of the cord 18 or article in connection therewith. The energy conversion layer 54 may be deposited on the cord 18 by painting, screen-printing, spraying, slot coating, dip coating, roller coating, and bar coating. Additionally, the energy conversion layer 54 may be prepared by methods that do not use a liquid carrier medium.

For example, a solid-state solution (homogenous mixture in a dry state) of one or more photoluminescent materials may be incorporated in a polymer matrix 60 to provide the energy conversion layer 54. The polymer matrix 60 may be formed by extrusion, injection molding, compression molding, calendaring, thermoforming, etc. In instances where one or more energy conversion layers 54 are rendered as particles, the single or multilayered energy conversion layers 54 may be implanted into a portion of the cord 18. When the energy conversion layer 54 includes a multilayer formulation, each layer may be sequentially coated. Additionally, the layers can be separately prepared and later laminated or embossed together to form an integral layer. The layers may also be coextruded to prepare an integrated multilayered energy conversion structure.

Referring back to FIGS. 3A and 3B, the photoluminescent structure 52 may optionally include at least one stability layer 56 to protect the photoluminescent material contained within the energy conversion layer 54 from photolytic and thermal degradation. The stability layer 56 may be configured as a separate layer optically coupled and adhered to the energy conversion layer 54. The stability layer 56 may also be integrated with the energy conversion layer 54. The photoluminescent structure 52 may also optionally include a protection layer 58 optically coupled and adhered to the stability layer 56 or any layer or coating to protect the photoluminescent structure 52 from physical and chemical damage arising from environmental exposure.

The stability layer 56 and/or the protection layer 58 may be combined with the energy conversion layer 54 to form an integrated photoluminescent structure 52 through sequential coating or printing of each layer, or by sequential lamination or embossing. Alternatively, several layers may be combined by sequential coating, lamination, or embossing to form a substructure. The substructure may then be laminated or embossed to form the integrated photoluminescent structure 52. Once formed, the photoluminescent structure 52 may be applied to a chosen fixture.

In some implementations, the photoluminescent structure 52 may be incorporated into a portion of the cord 18 as one or more discrete multilayered particles as shown in FIG. 2C. The photoluminescent structure 52 may also be provided as one or more discrete multilayered particles dispersed in the polymer matrix 60 that is subsequently applied to the cord as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

Figure 4:
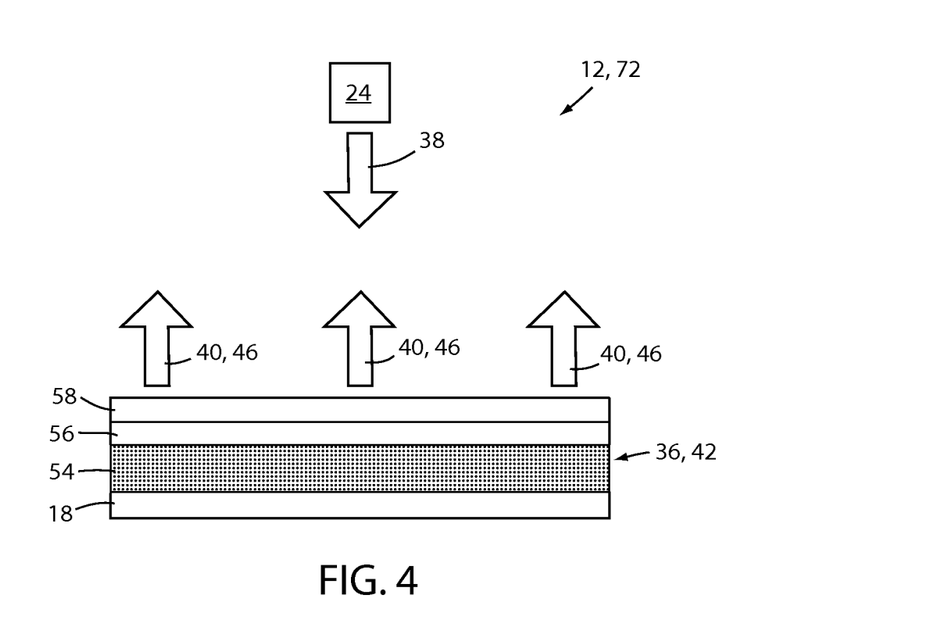
FIG. 4 is a schematic view of a front-lit configuration of a lighting apparatus.

Referring to FIG. 4, the lighting apparatus 12 is generally shown according to a front-lit configuration 72. In this configuration, the light or the excitation emission 38 emitted from the light source 24 may be converted to a first output emission 40 and/or the second output emission 46 by the energy conversion layer 54. The first output emission 40 may correspond to an output emission generated by the first photoluminescent portion 36 disposed on the first portion 22 of the cord 18. The second output emission 46 may correspond to an output emission generated by the second photoluminescent portion 42 disposed on the second portion 44 of the cord 18.

The excitation emission 38 comprises a first wavelength, and the output emissions (e.g. 40 and 46) comprise one or more wavelengths of light different from the first wavelength. The lighting apparatus 12 comprises the photoluminescent structure 52 disposed on or in at least one photoluminescent portion (e.g. 36 and 42). The photoluminescent structure 52 may be rendered as a coating and applied to a surface of a portion of the cord 18. The photoluminescent material may also be dispersed as the polymer matrix 60 corresponding to the energy conversion layer 54, which may be utilized to form the a strand or portion of the cord 18.

In some implementations, the energy conversion layer 54 may further include the stability layer 56 and/or the protection layer 58. In response to the light source 24 being activated, the excitation emission 38 is received by the energy conversion layer 54 and converted from the first wavelength to an output emission (e.g. 40, 46, etc.) having at least one wavelength different from the first wavelength. Each of the output emissions may comprise a plurality of wavelengths configured to emit any color of light from each of the photoluminescent portions discussed herein. In some implementations, each of the output emissions may correspond to different colors of light. The colors of light of the output emissions may correspond to the photochemical structure of each of the photoluminescent portions. In this way, each of the output emissions may be configured to emit different colors of light in response to receiving the excitation emission 38.

In some embodiments, the lighting apparatus 12 comprises at least one photoluminescent material incorporated in the polymer matrix 60 and/or energy conversion layer 54 and is configured to convert the excitation emission 38 at the first wavelength to the output emissions. In order to generate the plurality of wavelengths, as in some exemplary output emissions, the energy conversion layer 54 may comprise one or more photoluminescent materials configured to emit the output emissions as wavelengths of light in the red, green, and/or blue color spectrums. Such photoluminescent materials may further be combined to generate a wide variety of colors of light for the output emissions. For example, the red, green, and blue-emitting photoluminescent materials may be utilized in a variety of proportions and combinations to control the output color of the output emissions.

Each of the photoluminescent materials may vary in output intensity, output wavelength, and peak absorption wavelengths based on a particular photochemical structure and combinations of photochemical structures utilized in the energy conversion layer 54. As an example, the first output emission 40 may be changed by adjusting the wavelength of an excitation emission 38 to activate the photoluminescent materials at different intensities to alter the color of the first output emission 40. In addition to, or alternatively to the red, green, and blue-emitting photoluminescent materials, other photoluminescent materials may be utilized alone and in various combinations to generate the output emissions in a wide variety of colors. In this way, the lighting apparatus 12 may be configured for a variety of applications to provide a desired lighting color and effect for the cord 18.

To achieve the various colors and combinations of photoluminescent materials described herein, the lighting apparatus 12 may utilize any form of photoluminescent materials, for example phospholuminescent materials, organic and inorganic dyes, etc. For additional information regarding fabrication and utilization of photoluminescent materials to achieve various emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Mar. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC LUMINESCENT COMPOSITIONS AND TEXTILES," filed Dec. 19, 2013, all of which are incorporated herein by reference in their entirety.

The light source 24 may also be referred to as an excitation source and is operable to emit at least the excitation emission 38 or any of the excitation emissions discussed herein. The light source 24 or each of the emitters 48 may comprise any form of light source, for example halogen lighting, fluorescent lighting, light emitting diodes (LEDs), organic LEDs (OLEDs), polymer LEDs (PLEDs), solid state lighting or any other form of lighting configured to output the excitation emissions. The excitation emissions from the light source 24 may be configured such that the first wavelength corresponds to at least one absorption wavelength of the one or more photoluminescent materials of the energy conversion layer 54. In response to receiving the light at the first wavelength, the energy conversion layer 54 may be excited and output the one or more output wavelengths, for example, the first output emission 40 having the second wavelength. The excitation emission 38 provides an excitation source for the energy conversion layer 54 by targeting absorption wavelengths of a particular photoluminescent material or combination thereof utilized therein. As such, the lighting apparatus 12 may be configured to output the output emissions at a desired light intensity and color.

In an exemplary implementation, the light source 24 comprises an LED configured to emit the first wavelength, which may correspond to a blue spectral, violet, and/or ultra-violet color range. The blue spectral color range comprises a range of wavelengths generally expressed as blue light (~440-500 nm). In some implementations, the first wavelength may comprise a wavelength in the ultraviolet and near ultraviolet color range (~100-450 nm). In an exemplary implementation, the first wavelength may be approximately equal to 470 nm. Though particular wavelengths and ranges of wavelengths are discussed in reference to the first wavelength, the first wavelength may generally be configured to excite any photoluminescent material.

In an exemplary implementation, the first wavelength may be approximately less than 500 nm. The blue spectral color range and shorter wavelengths may be utilized as an excitation source for the lighting apparatus 12 due to these wavelengths having limited perceptual acuity in the visible spectrum of the human eye. By utilizing shorter wavelengths for the first wavelength, and converting the first wavelength with the conversion layer 54 to at least one longer wavelength, the lighting apparatus 12 may create a visual effect of light originating from the photoluminescent structure 52. In this configuration, the lighting apparatus 12 may provide for a cost effective system to provide lighting in a variety of locations.

As discussed herein, each of the plurality of wavelengths corresponding to the output emissions may correspond to a significantly different spectral color range. The wavelengths of one or more of the output emissions may correspond to a plurality of wavelengths configured to appear as substantially white light. The plurality of wavelengths may be generated by a red-emitting photoluminescent material having a wavelength of approximately 620-750 nm, a green emitting photoluminescent material having a wavelength of approximately 526-606 nm, and a blue or blue-green emitting photoluminescent material having a wavelength longer than the first wavelength and approximately 430-525 nm in one embodiment. The plurality of wavelengths may be utilized to generate a wide variety of colors of light from each of the photoluminescent portions converted from the first wavelength.

Figure 5:
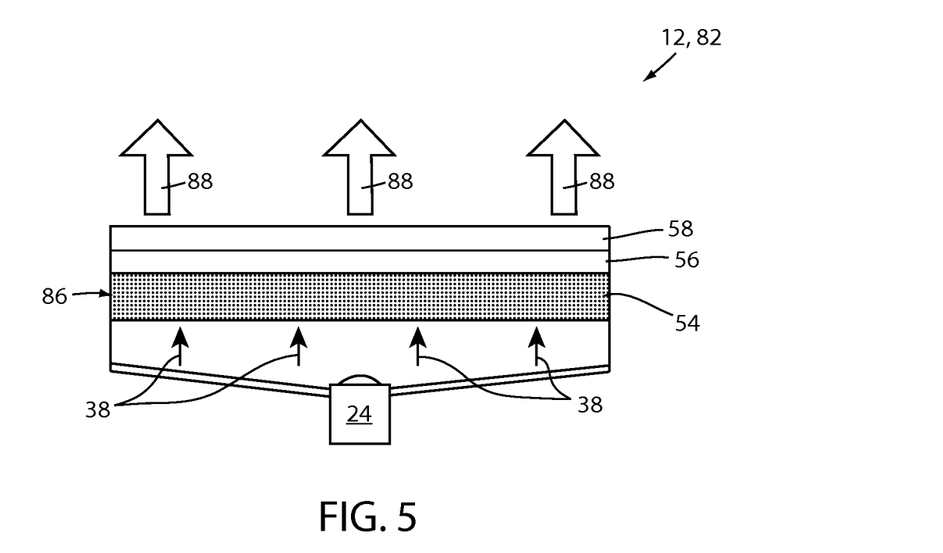
FIG. 5 is a schematic view of a backlit configuration of a lighting apparatus.

Referring to FIG. 5, the lighting apparatus 12 is generally shown according to a backlit configuration 82 to convert the excitation emission 38 from the light source 24 to an additional output emission. The backlit configuration 82 comprises the energy conversion layer 54 and/or photoluminescent material dispersed in the polymer matrix 60.

Similar to the energy conversion layer 54 demonstrated in reference to the front-lit configuration 72, the energy conversion layer 54 may be configured to be excited and output the one or more wavelengths corresponding to an output emission in response to receiving the excitation emission 38. In the backlit configuration, the polymer matrix 60 may be of at least partially light transmissive material such that the excitation emission 38 may be converted by the third photoluminescent portion 86 to emit a third output emission 88.

The plurality of wavelengths of the third output emission 88 may be configured to emit any color of light from the third photoluminescent portion 86 in response to the excitation of the energy conversion layer 54. The color of the light corresponding to the third output emission 88 may be controlled by utilizing particular types and/or ratios of photoluminescent materials as discussed herein. The third output emission 88 may correspond to light output by the lighting apparatus 12 that may illuminate the region R extending from the forward portion 16 of the vehicle 10. In this configuration, the lighting apparatus 12 may be operable to illuminate an exterior portion of the vehicle 10 to improve operation of the winch 14.

In some implementations, each of the photoluminescent portions 36, 42, and 86 may comprise an organic or inorganic fluorescent dye configured to convert the excitation emission 38 to the output emission. For example, the photoluminescent portions 36, 42, and 86 may comprise a photoluminescent structure of rylenes, xanthenes, porphyrins, phthalocyanines, or other materials suited to a particular Stokes shift defined by the first absorption range and emission fluorescence. In some embodiments, the photoluminescent portions 36, 42, and 86 may be of at least one inorganic luminescent material selected from the group of phosphors. The inorganic luminescent material may more particularly be from the group of Ce-doped garnets, such as YAG:Ce. As such, each of the photoluminescent portions 36, 42, and 86 may be selectively activated by a wide range of wavelengths received from the excitation emission 38 configured to excite a specific photoluminescent material and emit an output emission having a desired color.

Figure 6:
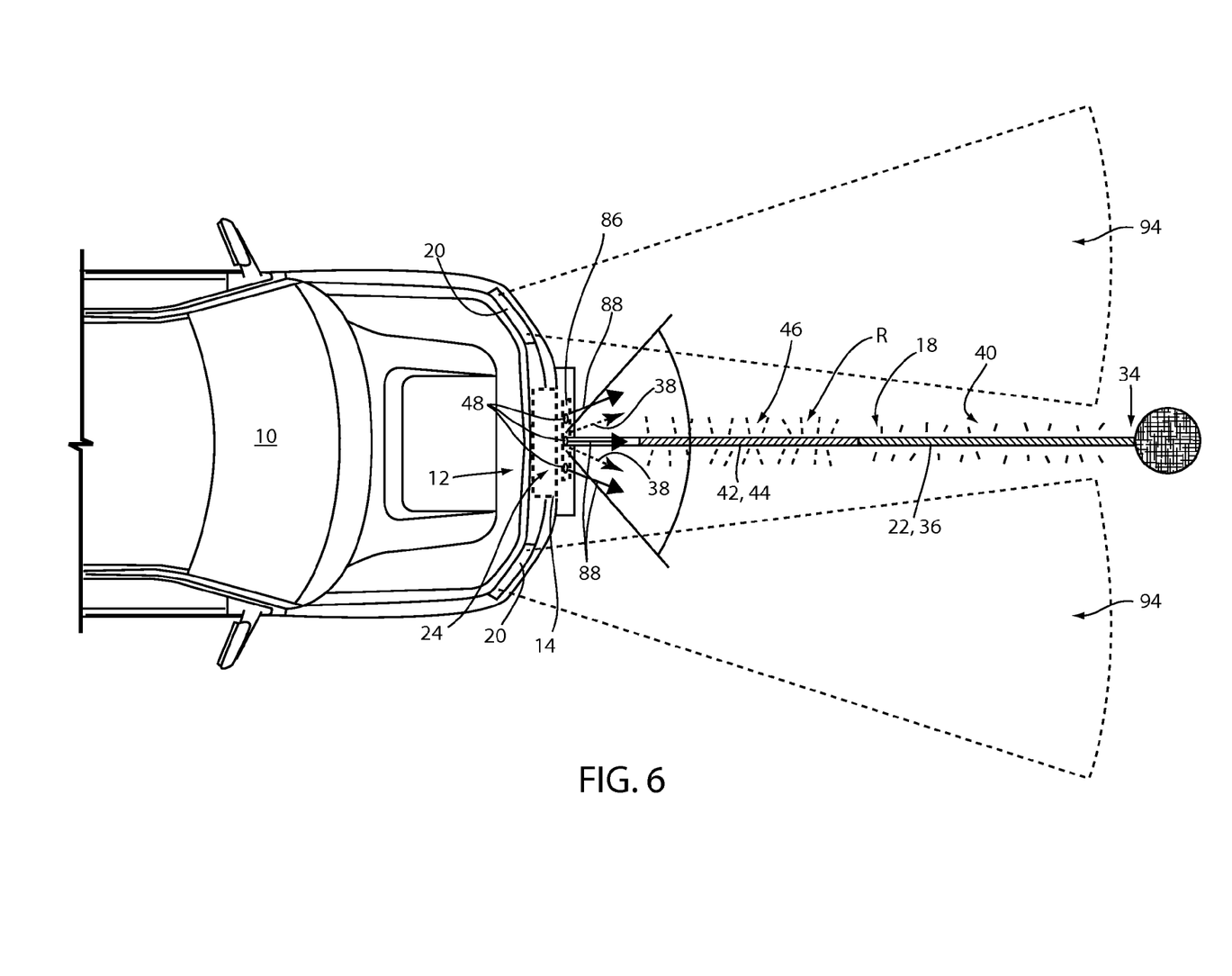
FIG. 6 is a top view of a vehicle demonstrating a lighting apparatus for a winch.

Referring now to FIG. 6, a top view of the vehicle 10 comprising a light apparatus 12 is shown. The exemplary embodiment in FIG. 6 may demonstrate the lighting apparatus 12 configured to illuminate each of the photoluminescent portions 36, 42, and 86. As shown in FIG. 6, the apparatus 12 may be configured to illuminate the first portion 22 and the second portion 44 of the cord 18 as well as the region R extending from the forward portion 16 of the vehicle 10 proximate the winch 14. As previously described, a plurality of headlight emissions 94 from the headlights 20 of the vehicle 10 may be ineffective in illuminating the region R proximate a central and forward portion 16 between the headlights 20. The photoluminescent portions 36, 42, and 86 are configured to illuminate various portions of the cord 18 and the region R to improve the operation and utility of the winch 14. Though the apparatus 12 is shown in FIG. 6 demonstrating a combination of the first photoluminescent portion 36, the second photoluminescent portion 42, and the third photoluminescent portion 86; the apparatus 12 may comprise one or more of the photoluminescent portions discussed herein alone or in combination.

The lighting apparatus 12 may be configured to illuminate the region R in the backlit configuration 82 and each of the first portion 22 and the second portion 44 of the cord 18 in the front-lit configuration 72. The combination of the backlit configuration 82 and the front-lit configuration 72 may be achieved by utilizing separate emitters of the plurality of emitters 48 to independently illuminate the region R in the backlit configuration 82 separately from the portions 22 and 44 of the cord 18. In this configuration, a first group of the emitters 48 may configured to emit the excitation emission 38 to excite the third photoluminescent portion 86 and a second group of the emitters 48 configured to emit the excitation emission 38 to excite the first and second photoluminescent portions 36 and 42. In some implementations, the light source 24 may also be configured to illuminate each of the photoluminescent portions 36, 42, and 86 by transmitting a part of the excitation emission 38 through the third photoluminescent portion 86.

In the backlit configuration 82, the photoluminescent material dispersed in the third photoluminescent portion 86 may have a limited concentration configured to convert only a first part of the excitation emission 38 to the third output emission 88. A second part of the excitation emission 38 may pass through the at least partially light transmissive material of the third photoluminescent portion 86 such that the second part of the excitation emission 38 and the third output emission 88 are emitted toward the region R. The second part of the excitation emission 38 may correspond to light in the blue or UV light range configured to excite the first photoluminescent portion 36 and/or the second photoluminescent portion 42.

In embodiments configured to emit the second part of the excitation emission 38 and the third output emission 88, the light emitted from the at least partially light transmissive material of the third photoluminescent portion 86 may correspond to a cool blue or bluish white light. The cool blue light may correspond to the combination of the third output emission and the second part of the excitation emission 38 and may illuminate the region R in front of the vehicle 10. Additionally, the second part of the excitation emission 38 may excite the first photoluminescent portion 36 and the second photoluminescent portion 42 such that the first portion 22 and the second portion 44 are illuminated. The first portion 22 and the second portion 44 may be illuminated as the winch retracts or extends the corresponding portion of the cord 18 through the region R wherein the second part of the excitation emission 38 is directed.

As discussed herein, the disclosure provides for a lighting apparatus configured to illuminate at least one portion of a cord of a winch to improve operation of the winch in dark environmental conditions. In some embodiments, the apparatus may be configured to illuminate a plurality of portions (e.g. 22 and 44) of the cord 18. In an exemplary embodiment, the apparatus may be configured to illuminate at least one portion of the cord 18 in a front-lit configuration 72 and a region proximate a central, forward portion 16 between the headlights 20 of the vehicle 10 in a backlit configuration 82. The various embodiments of the disclosure may provide for a winch with enhanced functionality, particularly when utilized in dark lighting conditions.

Figure 7:
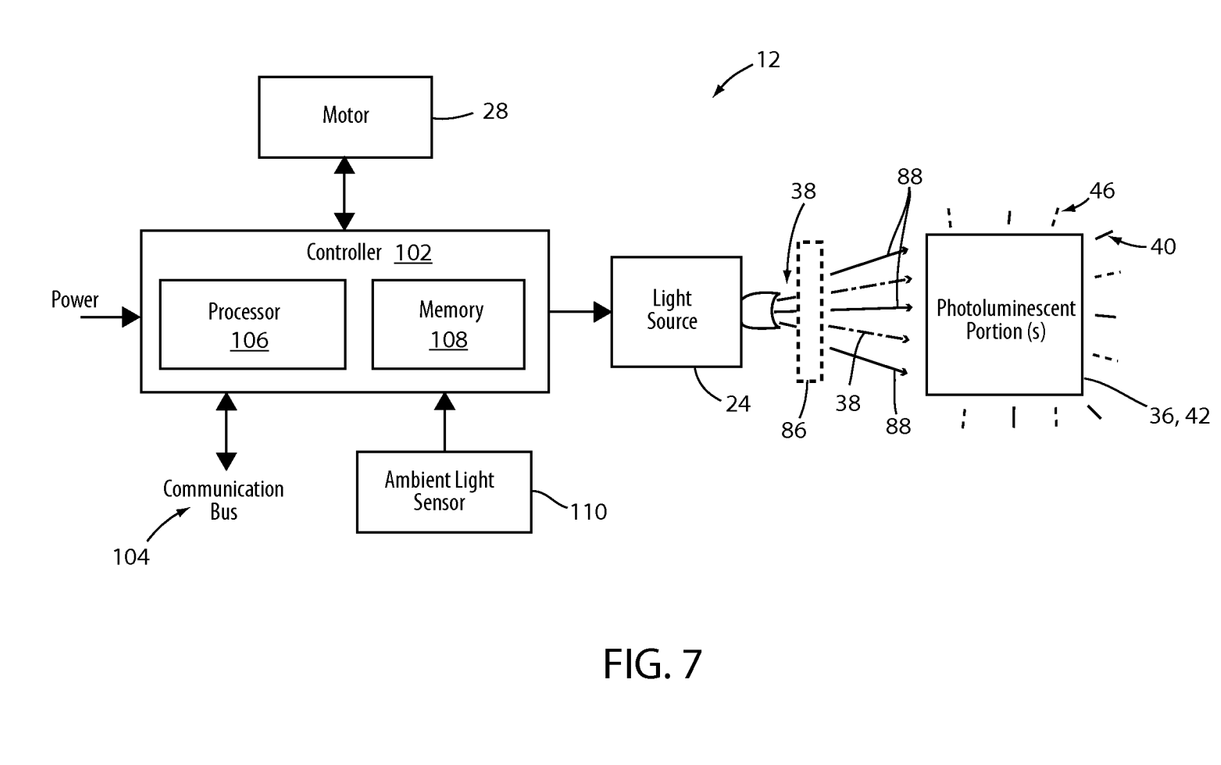
FIG. 7 is a block diagram of a lighting apparatus for a winch configured to illuminate at least one photoluminescent portion in accordance with the disclosure.

Referring now to FIG. 7, an exemplary block diagram of the lighting apparatus 12 is shown. The lighting apparatus 12 may comprise the controller 102 configured to control the illumination of the light source 24 to illuminate the photoluminescent portions 36, 42, and 86. The lighting controller 102 may be in communication with a communication bus 104 of the vehicle 10. The communication bus 104 may be configured to deliver signals to the controller 102 identifying various vehicle states and/or control conditions of the winch 14. For example, the communication bus 104 may be configured to communicate to the controller 102 a drive selection of the vehicle, an ignition state, a remote activation of the light source 24, or any other information or control signals that may be utilized to adjust the illumination of the lighting apparatus 12. In this way, the controller 102 may control the winch 14 and the light source 24 in response to one or more states of the vehicle 10. Though the controller 102 is discussed herein, in some embodiments the light source 24 may be activated in response to one or more electrical or electro-mechanical switches, which may also control an operation of the winch 14.

The controller 102 may comprise a processor 106 comprising one or more circuits configured to receive the signals from the communication bus 104 and output signals to control the light source 24 to emit the excitation emission 38. The processor 106 may be in communication with a memory 108 configured to store instructions to control the activation of the light source 24. In some implementations, the controller 102 may be in communication with and/or configured to control the motor 28 or actuator of the winch 14. In this configuration, the apparatus 12 may be configured to control the motor 28 of the winch 14 and the light source 24 based on one or more signals received by from the communication bus 104 and various corresponding vehicle states or inputs received by one or more user interfaces or systems of the vehicle. Some examples of systems that may be in communication with the controller 102 may include, but are not limited to a user interface, infotainment system, navigational system, instrument cluster comprising one or more inputs, various vehicle control modules, etc.

The lighting controller 102 may further be in communication with an ambient light sensor 110. The ambient light sensor 110 may be operable to communicate a light condition, for example a level brightness or intensity of the ambient or environmental light proximate the vehicle 10. In response to the level of the ambient light, the lighting controller 102 may be configured to adjust a light intensity output from the light source 24. The intensity of the light output from the light source 24 may be adjusted by controlling a duty cycle, current, or voltage supplied to the light source 24.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An illumination apparatus for a winch configured to engage a retractable cord comprising:
    a light source configured to emit an excitation emission at a first wavelength to illuminate at least a portion of the retractable cord; and
    a first photoluminescent portion disposed on the retractable cord and configured to emit a first output emission having a second wavelength different from the first wavelength in response to receiving the excitation emission.

2. The illumination apparatus according to claim 1, wherein the first photoluminescent portion corresponds to a marker configured to provide a visible notification of a first portion of the retractable cord.

3. The illumination apparatus according to claim 1, wherein the first photoluminescent portion corresponds to a coating applied to a first portion of the retractable cord configured to locate the first portion relative to a length of the retractable cord.

4. The illumination apparatus according to claim 1, wherein the excitation emission corresponds to a wavelength of light approximately less than 500 nm in length.

5. The illumination apparatus according to claim 1, further comprising a second photoluminescent portion disposed on the retractable cord.

6. The illumination apparatus according to claim 5, wherein the second photoluminescent portion is configured to emit a second output emission having a third wavelength different from the first wavelength and the second wavelength.

7. The illumination apparatus according to claim 6, wherein the first output emission corresponds to a substantially different color of light than the second output emission.

8. The illumination apparatus according to claim 5, wherein the first photoluminescent portion is configured to provide a visible notification of a first portion of the retractable cord and the second photoluminescent portion is configured to provide a visible notification of a second portion of the retractable cord.

9. A winch assembly configured to engage a retractable cord comprising:
    a light source configured to emit an excitation emission at a first wavelength to illuminate at least a portion of the retractable cord; and
    a photoluminescent portion disposed proximate the light source and configured to convert a first part of the excitation emission to a first output emission comprising at least a second wavelength of light to illuminate a region proximate the retractable cord.

10. The winch assembly according to claim 9, wherein the at least a second wavelength corresponds to a plurality of wavelengths configured to form a substantially white light.

11. The winch assembly according to claim 9, further comprising a second photoluminescent portion disposed on the retractable cord.

12. The winch assembly according to claim 11, wherein the first photoluminescent portion is configured to transmit a second part of the excitation emission therethrough and the second photoluminescent portion is configured to absorb the second part of the excitation emission.

13. The winch assembly according to claim 12, wherein the second photoluminescent portion is configured to emit a second output emission comprising a third wavelength of light in response to receiving the second part of the excitation emission.

14. The winch assembly according to claim 13, wherein the third wavelength of light corresponds to a colored light configured to provide a visible notification of a position of the retractable cord.

15. The winch assembly according to claim 14, wherein the position corresponds to a region of the retractable cord proximate a distal end portion.

16. An illumination apparatus for a winch configured to engage a retractable cord comprising:

a light source configured to emit an excitation emission at a first wavelength to illuminate at least a portion of the retractable cord;

a first photoluminescent portion disposed on the retractable cord and configured to emit a first output emission having a second wavelength different from the first wavelength in response to receiving the excitation emission; and a second photoluminescent portion disposed on the retractable cord configured to emit a second output emission having a third wavelength different from the first wavelength and the second wavelength in response to receiving the excitation emission.

17. The illumination apparatus according to claim 16, wherein the first photoluminescent portion and the second photoluminescent portion each correspond to a plurality of markers configured to provide a visible notification of a position of the retractable cord.

18. The illumination apparatus according to claim 16, wherein the excitation emission corresponds to a wavelength of light approximately less than 500 nm in length.

19. The illumination apparatus according to claim 16, wherein the winch is mounted to a forward portion of a vehicle.

20. The illumination apparatus according to claim 19, wherein the forward portion corresponds to portion substantially between a driver side headlight and a passenger side headlight of the vehicle.

* * * * *